United States Patent

Manabe et al.

[11] Patent Number: 5,292,810
[45] Date of Patent: Mar. 8, 1994

[54] THERMOPLASTIC ELASTOMER COMPOSITION

[75] Inventors: Kenji Manabe; Masahiro Niwano, both of Tsukuba; Tadashi Hikasa, Sodegaura, all of Japan

[73] Assignee: Sumitomo Chemical Company, Limited, Osaka, Japan

[21] Appl. No.: 937,883

[22] PCT Filed: Aug. 21, 1991

[86] PCT No.: PCT/JP91/01110
§ 371 Date: Oct. 19, 1992
§ 102(e) Date: Oct. 19, 1992

[87] PCT Pub. No.: WO92/03501
PCT Pub. Date: Mar. 5, 1992

[30] Foreign Application Priority Data

Aug. 22, 1990 [JP] Japan .................. 02-221767
Aug. 7, 1991 [JP] Japan .................. 03-197927

[51] Int. Cl.$^5$ .............................................. C08L 63/00
[52] U.S. Cl. ................................................ 525/190
[58] Field of Search ..................................... 525/190

[56] References Cited

U.S. PATENT DOCUMENTS 5,171,765 12/1992 Jones et al. ................. 525/443
5,187,224 2/1993 Hamanaka et al. .......... 525/98

FOREIGN PATENT DOCUMENTS 0287233 10/1988 European Pat. Off. .
0331312 9/1989 European Pat. Off. .
52-21534 6/1977 Japan .
58-213038 12/1983 Japan .
60-210649 10/1985 Japan .
61-44943 3/1986 Japan .

*Primary Examiner*—Vasu S. Jagannathan
*Attorney, Agent, or Firm*—Stevens, Davis, Miller & Mosher

[57] ABSTRACT

The present invention provides a thermoplastic elastomer composition having high thermal resistance. It comprises a thermoplastic graft copolymer of which main chain is constituted by a polymer having a glass transition temperature of 10° C. or blow and side chain is constituted by an aromatic oligomer having a flow temperature of 100° C. or above, and an olefinic polymer.

11 Claims, No Drawings

THERMOPLASTIC ELASTOMER COMPOSITION

FIELD OF ART

This invention relates to a thermoplastic elastomer composition having high thermal resistance.

BACKGROUND ART

The thermoplastic elastomers (hereinafter abbreviated as TPE) which are industrially used at present can be roughly divided into two types: TPE comprising a block copolymer composed of soft segments and hard segments and TPE, called elastomer alloy, comprising a partially crosslinked rubber and a plastic phase-separated therefrom. As the former type, there are known, for instance, the block copolymers called polyester elastomers consisting of an aliphatic polyether portion such as polytetramethylene glycol and a polyester portion such as polyethylene terephthalate and polybutylene terephthalate, and the block copolymers called polyamide elastomers consisting of an aliphatic polyether portion and a polyamide portion such as polydodecanolactum. As the latter type, there are known, for example, the elastomer alloys comprising a dynamically vulcanized alloy of polypropylene and an ethylenepropylene-diene terpolymer.

Also, European Patent Laid-Open No. 0287233 discloses a polymer solution for coating using a copolymer having an aromatic polyester as branch polymer, namely a copolymer having an aromatic polymer covalently bonded to an acrylic resin or polyester resin, said polymer solution being characterized by being capable of forming a coat with high hardness. However, this European patent is silent on thermoplastic resins and TPE.

It is to be noted that with TPE's comprising a block copolymer composed of soft and hard segments, it is merely possible to obtain relatively hard elastomer having a Shore hardness (D scale) of about 40 or greater. Also, these TPE's take a large compression set and are not so high in thermal resistance.

On the other hand, the elastomer alloys, although capable of forming the soft elastomers having a Shore Scale A hardness of about 30, are rather poor in thermal resistance.

The object of the present invention is to provide a resin composition useful as a thermoplastic elastomer with excellent thermal resistance.

DISCLOSURE OF THE INVENTION

In view of these circumstances, the present inventors have pursued further studies on the subject matter and, as a result, found out a composition containing a thermoplastic graft copolymer comprising a polymer having a glass transition temperature of 10° C. or below as main chain and a specific aromatic oligomer as side chain, and an olefinic polymer. It was further found that said composition had the excellent properties as a thermoplastic elastomer. These findings have led to the attainment of the present invention.

Thus, the present invention pertains to a thermoplastic elastomer composition containing a thermoplastic graft copolymer comprising a polymer having a glass transition temperature of 10° C. or below as main chain and an aromatic oligomer having a flow temperature defined below of 100° C. or above as side chain, and an olefinic polymer.

Flow temperature: the temperature at which the oligomer shows a melt viscosity of 48,000 poises when the oligomer is melted by heating at a rate of 4° C./min and extruded from a nozzle of 1 mm in inner diameter and 10 mm in length under a load of 100 kg/cm$^2$.

The main chain (backbone polymer) constituting the graft copolymer of this invention is the one having a glass transition temperature of 10° C. or below, preferably 0° C. or below, more preferably −10° C. or below. The "glass transition temperature" referred to herein means the secondary transition point at which absorption of heat is observed at the heating rate of 10° C./min in a differential scanning calorimeter (DSC). If the glass transition temperature (which may hereinafter be abbreviated at Tg) of said main chain (backbone polymer) exceeds 10° C., the produced thermoplastic elastomer composition of this invention may fail to show rubber elasticity in the working temperature range above normal temperature.

As preferred examples of the main chain (backbone polymer) having Tg of 10° C. or below constituting the graft copolymer of this invention, there can be mentioned olefin polymers, conjugated diene polymers and vinyl polymer, namely, homopolymer and random copolymers such as acrylic ester polymers, styrene-butadiene copolymer and the hydrogenated product thereof, styrene-isoprene copolymer and the hydrogenated product thereof, polybutadiene, polyisoprene, ethylene-propylene copolymer, ethylene-propylene-diene terpolymer, acrylonitrile-butadiene copolymer and the hydrogenate product thereof, polychloroprene, ethylene-acrylic ester copolymer, homopolymers such as chlorosulfonated polyethylenes; organopolysiloxanes, polyphosphazene and the like. It is also possible to use the copolymers of the monomers constituting said homopolymers or random copolymers and the copolymerizable monomers having unsaturated double bonds. In any of these copolymers, however, the copolymer composition must be controlled so that Tg thereof will become 10° C. or below.

The side chain aromatic oligomer constituting the graft copolymer of this invention is an aromatic oligomer having a flow temperature of 100° C. or above, preferably 150° C. or above. An aromatic oligomer having a flow temperature of 170° C. or above is more preferred. Also, the flow temperature of said aromatic oligomer should not be higher than 400° C., preferably not higher than 350° C., more preferably not higher than 300° C.

When the flow temperature of said aromatic oligomer is lower than 100° C., the temperature range in which the obtained thermoplastic elastomer composition shows rubber elasticity is narrowed, that is, said thermoplastic elastomer composition becomes unsatisfactory in thermal resistance.

The aromatic oligomer having a flow temperature of 100° C. or above, which constitutes the graft copolymer of this invention, is an oligomer having a benzene ring in the main sequence, preferably an oligomer containing 50% by weight or more, preferably 60% by weight or more of the structural units represented by the following formula (1):

wherein X is selected from O and S, and the structural unit containing O and the structural unit containing S may both be contained in one oligomer; and Ar is selected from the following formulae (2), (3) and (4):

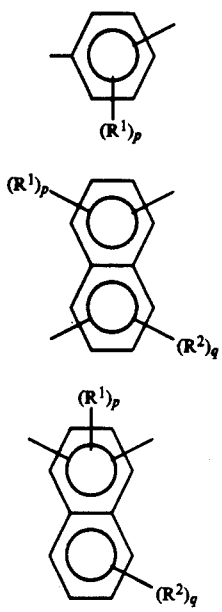

wherein R¹ and R² are each selected from an alkyl group having 1 to 3 carbon atoms or a phenyl group; R¹ and R² may be a same or different groups, and the different groups may be attached to one benzene ring; and p and q are each an integer of 0 to 2.

The number-average degree of polymerization of said oligomer is 2 to 10, preferably 3 to 8, more preferably 4 to 7.

The number-average molecular weight of said oligomer is preferably in the range of 300 to 1,500, more preferably 400 to 1,000. When the number-average molecular weight of said oligomer is less than 300, the polycondensate becomes prone to be thermally decomposed and its flow temperature also lowers excessively, resulting in poor thermal resistance of the obtained graft copolymer. When said number-average molecular weight exceeds 1,500, the flow temperature approaches the thermal decomposition temperature of said oligomer, which deteriorates moldability of the obtained thermoplastic elastomer composition.

Said oligomer mainly composed of a hydroxyarylcarboxylic acid polymer may contain a structure in which a monomer such as hydroxyalkylcarboxylic acid, aminoalkylcarboxylic acid, aminoarylcarboxylic acid or the like has been polycondensed or a structure in which a monofunctional carboxylic acid compound, a phenol compound or an amino compound has been condensed, for controlling the properties such as melting point of the oligomer.

The reason why the thermoplastic elastomer composition of this invention shows rubber elasticity is assumed to be that the side chain aromatic oligomer of the graft copolymer constituting said composition functions as hard segment in the graft copolymer to form a microdomain structure and serve as physical cross-linking points. This supposition, however, is in no way restrictive to the present invention.

The ratio of the polymer having Tg of 10° C. or below to the aromatic oligomer having a flow temperature of 100° C. or above in the graft copolymer constituting the thermoplastic elastomer of this invention is 99:1 to 50:50 (by weight), preferably 97:3 to 65:35 (by weight).

When the ratio of the polymer having Tg of 10° C. or below exceeds 99% by weight, the obtained thermoplastic elastomer composition is subject to excessive plastic deformation in the temperature range above room temperature, and when said ratio is less than 50% by weight, said composition may fail to show desired rubber elasticity.

Said graft copolymer may be used singly as a thermoplastic elastomer, but by blending a polymer containing an olefinic polymer with said graft copolymer, it becomes possible to improve melt fluidity and thus improve moldability, without impairing the properties as a thermoplastic elastomer.

The olefinic polymers usable in this invention include homopolymers such as polyethylene and polypropylene, copolymers such as ethylene-propylene copolymer, ethylene-butene copolymer and ethylene-propylene-diene terpolymer, and copolymers of the olefin monomers composing said homopolymers or copolymers and copolymerizable monomers having unsaturated double bonds, such as ethylene-methyl acrylate copolymer, ethylene-ethyl acrylate copolymer, etc. These olefinic polymers may be either amorphous or crystalline.

Among them, polyethylene, polypropylene, ethylene-propylene copolymer and ethylene-methyl acrylate copolymer are preferred.

Also, the olefinic polymer used in this invention is preferably a polymer containing 30% by weight or more of ethylene and/or propylene. Said olefinic polymer preferably has a glass transition temperature of 10° C. or below.

The ratio of the graft copolymer to the olefinic polymer in the thermoplastic elastomer composition of this invention is 99:1 to 50:50 (by weight), preferably 95:5 to 70:30 (by weight). When the ratio of the graft copolymer exceeds 99% by weight, melt fluidity of the composition becomes unsatisfactory, and when said ratio is less than 50% by weight, the physical crosslinking points of the side chain (aromatic oligomer) are lessened in number and the obtained thermoplastic elastomer composition does not show rubber elasticity.

Further, the thermoplastic elastomer of this invention may be properly blended with a filler such as carbon black, silica, calcium carbonate, mica, diatom earth, zinc white, basic magnesium carbonate, aluminum silicate, titanium dioxide, talc, glass fiber, silica-alumina fiber, etc., a plasticizer, an antiaging agent, a colorant, an ultraviolet absorber, a flame retardant, an oil resistance improver, a scorch retarder, a tackifier, etc.

As for the way for producing the graft copolymer constituting the thermoplastic elastomer of this invention, there can be mentioned a method in which a polymer having a glass transition temperature of 10° C. or below and possessing a functional group reactable with carboxyl group is reacted with an aromatic oligomer having a flow temperature of 100° C. or above and possessing a carboxyl group at one terminal of the molecule. As examples of the functional groups reactable with carboxyl group, there can be cited epoxy group, isocyanate group and acetoxyl group. Epoxy group is especially preferred.

As the polymer containing epoxy group, there can be mentioned methyl acrylate-glycidyl methacrylate copolymer, ethyl acrylate-glycidyl methacrylate copolymer, propyl acrylate-glycidyl methacrylate copolymer, butyl acrylate-glycidyl methacrylate copolymer, hexyl acrylate-glycidyl methacrylate copolymer, dodecyl acrylate-glycidyl methacrylate copolymer, and the like.

There can also be mentioned methyl acrylate-glycidylstyrene copolymer, ethyl acrylate-glycidylstyrene copolymer, propyl acrylate-glycidylstyrene copolymer, butyl acrylate-glycidylstyrene copolymer, hexyl acrylate-glycidylstyrene copolymer, dodecyl acrylate-glycidylstyrene copolymer, and the like.

There can further be mentioned methyl acrylate-N-[4-(2,3-epoxypropoxy)-3,5-dimethylbenzyl]acrylamide copolymer, ethyl acrylate-N-[4-(2,3-epoxypropoxy)-3,5-dimethylbenzyl]acrylamide copolymer, propyl acrylate-N-[4-(2,3-epoxypropoxy)-3,5-dimethylbenzyl]acrylamide copolymer, butyl acrylate-N-4-(2,3-epoxypropoxy)-3,5-dimethylbenzyl]acrylamide copolymer, hexyl acrylate-N-[4-(2,3-epoxypropoxy)-3,5-dimethylbenzyl]acrylamide copolymer, dodecyl acrylate-N-[4-(2,3-epoxypropoxy)-3,5-dimethylbenzyl]acrylamide copolymer, and the like.

There can additionally be mentioned acrylonitrile-butadiene-glycidyl methacrylate terpolymer, acrylonitrile-butadiene-glycidylstyrene terpolymer, acrylonitrile-butadiene-N-[4-(2,3-epoxypropoxy)-3,5-dimethylbenzyl]acrylamide terpolymer, and the like.

There can also be mentioned ethylene-vinyl acetate-glycidyl methacrylate terpolymer, ethylene-vinyl acetate-glycidylstyrene terpolymer, ethylene-vinyl acetate-N-[4-(2,3-epoxypropoxy)-3,5-dimethylbenzyl]-acrylamide terpolymer, and the like.

There can further be mentioned ethylene-methyl acrylate-glycidyl methacrylate terpolymer, ethylene-ethyl acrylate-glycidyl methacrylate terpolymer, ethylene-propyl acrylate-glycidyl methacrylate terpolymer, ethylene-butyl acrylate-glycidyl methacrylate terpolymer, ethylene-hexyl acrylate-glycidyl methacrylate terpolymer and ethylene-dodecyl acrylate-glycidyl methacrylate terpolymer, and the like.

There can further be mentioned ethylene-methyl acrylate-glycidylstyrene terpolymer, ethylene-ethyl acrylate-glycidylstyrene terpolymer, ethylene-propyl acrylate-glycidylstyrene terpolymer, ethylene-butyl acrylate-glycidylstyrene terpolymer, ethylene-hexyl acrylate-glycidylstyrene terpolymer, ethylene-dodecyl acrylate-glycidylstyrene terpolymer, and the like.

There can also be mentioned ethylene-methyl acrylate-N-[4-(2,3-epoxypropoxy)-3,5-dimethylbenzyl]-acrylamide terpolymer, ethylene-ethyl acrylate-N-[4-(2,3-epoxypropoxy)-3,5-dimethylbenzyl]acrylamide terpolymer, ethylene-propyl acrylate-N-[4-(2,3-epoxypropoxy)-3,5-dimethylbenzyl]acrylamide terpolymer, ethylene-butyl acrylate-N-[4-(2,3-epoxypropoxy)-3,5-dimethylbenzyl]-acrylamide terpolymer, ethylene-hexyl acrylate-N-[4-(2,3-epoxypropoxy)-3,5-dimethylbenzyl]acrylamide terpolymer, ethylene-dodecyl acrylate-N-[4-(2,3-epoxypropoxy)-3,5-dimethylbenzyl]acrylamide terpolymer, and the like.

There can also be mentioned styrene-butadiene-glycidyl methacrylate terpolymer, styrene-butadiene-glycidylstyrene terpolymer, styrene-butadiene-N-[4-(2,3-epoxypropoxy)-3,5-dimethylbenzyl]acrylamide terpolymer and the like.

These copolymers can be usually obtained by well-known radical polymerization.

The aromatic oligomers having a flow temperature of 100° C. or above, preferably 150° C. or above, and possessing a carboxyl group at one terminal of the molecule, which are used in the present invention, are preferably those represented by the following formula (5):

wherein X is selected from O and S, and the structural unit containing O and the structural unit containing S may be both contained in one oligomer at the same time; n is a number average, which is 2 to 10; $R^{10}$ is an alkyl group having 5 or more carbon atoms or an aryl or aralkyl group having 6 or more carbon atoms; and Ar is selected from the general formulae (6), (7) and (8):

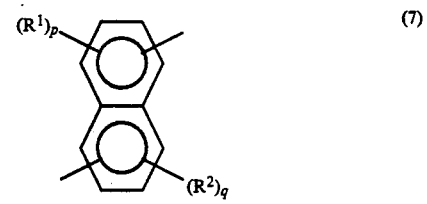

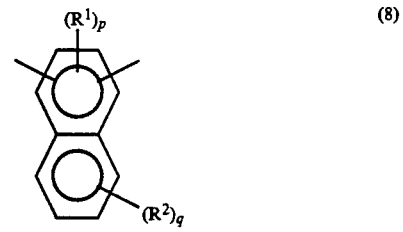

wherein $R^1$ and $R^2$ are each selected from an alkyl group having 1 to 3 carbon atoms and a phenyl group, but $R^1$ and $R^2$ may be a same or different groups, and the different substituents may be attached to the same benzene ring; p and q are each an integer of 0 to 2.

Said oligomers may be copolymerized with a hydroxycarboxylic acid having 2 to 6 carbon atoms. The number-average molecular weight of said aromatic oligomers having a carboxyl group at one terminal of the molecule is preferably in the range of 300 to 1,500, and their number-average degree of polymerization, which depends on what are selected for $R^{10}$, $R^1$, $R^2$ and Ar, is 2 to 10, preferably 3 to 8, more preferably 4 to 7.

The hydroxyarylcarboxylic acid polymer can be produced by any available method as far as it is capable of forming a polycondensate by using as starting material a hydroxyarylcarboxylic acid and, if necessary, a small quantity of a copolymerizable monomer such as a hydroxyalkylcarboxylic acid, an aminoalkylcarboxylic acid, an aminoarylcarboxylic acid, which have 2 to 6 carbon atoms, a monofunctional phenol compound, a carboxylic acid compound, an amino compound or the like. It is, however, recommended to use the following method.

An acetylating agent such as acetic anhydride or acetyl chloride is added to a hydroxyarylcarboxylic acid, and the mixture is heated and stirred to obtain an acetoxyarylcarboxylic acid. In the above reaction, in case of acetylating the hydroxyarylcarboxylic acid, etc., with acetic anhydride, acetylation can be accomplished by carrying out the reaction at 100° C. or above for 15 minutes or more, and in case of using acetyl chloride, acetylation can be attained by conducting the reaction at room temperature or above for 30 minutes or more. In either reaction, it is desirable that acetic anhydride or acetyl chloride be added in an excess amount, preferably about 1.1 mole to one mole of the hydroxyl group to be reacted. After acetylation has been completed, the reaction system is heated and acetic acid is distilled away with stirring to let the polycondensation reaction proceed on. The temperature of the reaction system needs to be raised to preferably 200° C. or above. The number-average molecular weight can be controlled by adjusting the amount of acetic acid distilled away. For controlling the polymerization degree to the desired level, it is necessary to calculate the amount of the monomer such as hydroxyarylcarboxylic acid supplied and the amount of acetic acid to be distilled away.

The aromatic oligomers containing a mercaptoarylcarboxylic acid can be produced in the same way as described above.

The obtained aromatic oligomer is preferably washed with a solvent such as methanol, ethanol, acetone, tetrahydrofuran, N-methylpyrrolidone, chloroform, pyridine or the like to remove the monomer and dimer for improving heat stability of the oligomer.

As for the aromatic oligomers having a carboxyl group at one terminal of the molecule, a mixture of a monocarboxylic acid having an alkyl group of 5 or more, preferably 5 to 20 carbon atoms, or an aryl group of 6 or more, preferably 6 to 15 carbon atoms, a hydroxyarylcarboxylic acid and, if necessary, a hydroxycarboxylic acid of 2 to 6 carbon atoms is acetylated with acetic anhydride or acetyl chloride in the same way as the above-described preparation of a hydroxyarylcarboxylic acid polymer and then acetic acid is distilled away to obtain a polycondensate. In this reaction, the number-average molecular weight is decided by the molar ratio of the monocarboxylic acid to the hydroxycarboxylic acid.

The obtained oligomer having a carboxyl group at one terminal of the molecule is preferably washed with a solvent such as methanol, ethanol, acetone, tetrahydrofuran, N-methylpyrrolidone, chloroform, pyridine or the like for the same reason as stated above.

The thermoplastic elastomer of this invention can be obtained by reacting a polymer having Tg of 10° C. or below and possessing a functional group reactable with carboxyl group and an aromatic oligomer having a flow temperature of 100° C. or above and possessing a carboxyl group at one terminal of the molecule to obtain a graft copolymer, and mixing this graft copolymer with an olefinic polymer, or by mixing a polymer having Tg of 10° C. or below having a functional group reactable with carboxyl group with an olefinic polymer, and reacting this mixture with an aromatic oligomer having a flow temperature of 100° C. or above and possessing a carboxyl group at one terminal of the molecule, or by mixing and reacting all at once a polymer having Tg of 10° C. or below and possessing a functional group reactable with carboxyl group, an aromatic oligomer having a flow temperature of 100° C. or above and possessing a carboxyl group at one terminal of the molecule and an olefinic polymer. The way of reaction and/or mixing is not specifically defined, but a method is recommended in which reaction and/or mixing is effected by melt kneading.

This melt kneading can be accomplished by using an ordinary kneader at or above the higher one of the melting temperatures (flow temperature in the case of an aromatic oligomer and melting point in case the olefinic polymer is a crystalline polymer) of the polymers existing in the system at the time of kneading. As the kneader, there can be used any type of kneading means as far as it is capable of exerting high shearing force at high temperatures, such as Banbury mixer, single-screw extruder, twin-screw extruder, roll mill, kneader, etc.

The reaction or mixing temperature is preferably above the melting temperature of the polymer showing the highest melting temperature among the polymers existing in the system at the time of kneading and below the thermal decomposition temperature of the polymer showing the lowest thermal decomposition temperature among the polymers existing in the system. If the reaction and/or mixing temperature is below the melting temperature of the polymer showing the highest melting temperature among the polymers existing in the system at the time of kneading, there may not take place the reaction between the carboxyl group of the aromatic oligomer and the polymer having Tg of 10° C. or below, or the olefinic polymer may not be mixed well. Also, if the reaction and/or mixing temperature is above the thermal decomposition temperature of the polymer showing the lowest thermal decomposition temperature among the polymers existing in the system at the time of kneading, decomposition of said polymer will progress considerably during kneading to exert adverse effects.

For reacting a polymer having Tg of 10° C. or below and possessing a functional group reactable with carboxyl group and an aromatic oligomer having a flow temperature of 100° C. or above and possessing a carboxyl group at one terminal of the molecule, that is, for promoting grafting, it is desirable to use the highest possible temperature within the above-defined range. Also, the longer the reaction time and the greater the shearing force, the more effective for said purpose.

For further promoting grafting, it is recommended to use a phosphine type catalyst such as triphenylphosphine, triparatolylphosphine, trimetatolylphosphine, triorthotolylphosphine, tri-2,6-dimethoxyphenylphosphine, etc., or an amine type catalyst such as 2-phenylimidazole, 2-undecylimidazole, 2,4-diamino-6-[2'-undecylimidazolyl-(1')]-ethyl-S triazine, 1,8-diazabicyclo(5,4,0)undecene-7, etc.

The thermoplastic elastomer composition of this invention can be improved in melt fluidity without impairing rubber elasticity. Also, it shows the behavior as an excellent rubber elastomer at high temperatures and is also excellent in thermal resistance and very useful.

BEST MODE FOR CARRYING OUT THE INVENTION

The present invention is described in further detail below with reference to the examples thereof. The present invention, however, is in no way limited by these examples.

The conditions used for determination of various properties are as described below.

TENSILE TEST

Measurement was made according to ASTM D-638 by using a tensile tester Tensilon EM-500 mfd. by Toyo Baldwin Co., Ltd.

COMPRESSION SET TEST

Compression set was measured according to JIS K-6301 by using a constant-strain compression tester mfd. by Toyo Seiki Seisaku-sho, Ltd.

SHORE HARDNESS

It was measured according to ASTM D-2240 by using a Shore hardness tester mfd. by Toyo Seiki Seisaku-sho, Ltd. Sample thickness was 4.2 mm. Measurement was made at intervals of 15 seconds.

FLOW TEMPERATURE

By using a Koka-type flow tester CFT-500 mfd. by Shimadzu Corp., the test oligomer was melted by heating at a rate of 4° C./min and extruded from a nozzle of 1 mm in inner diameter and 10 mm in length under a load of 100 kg/cm$^2$, and the temperature at which the molten oligomer showed a melt viscosity of 48,000 poise was expressed as flow temperature.

MELT INDEX (which may hereinafter be abbreviated as MI)

Measurement was made by a melt indexer mfd. by Toyo Seiki seisaku-sho, Ltd.

Examples 1-3 and Comparative Example 1

An ethylene-methyl acrylate-glycidyl methacrylate terpolymer (ethylene/methyl acrylate/glycidyl methacrylate=35/63/2 (ratio by weight); MI at 190° C. under a load of 2.16 kg=8.7 g/10 min) was obtained according to the method described in Japanese Patent Application Kokai No. 61-127709, Example 5.

The glass transition temperature of this polymer was measured by a stand-alone differential scanning calorimeter DSC-50 mfd. by Shimadzu Corp., in a nitrogen atmosphere at a heating rate of 10° C./min. The heat absorption starting temperature was determined by the tangential method from the obtained chart in the usual way, and the determined temperature was expressed as glass transition temperature. The thus determined glass transition temperature (of the polymer) was −33.7° C. Also, the weight loss on heating of this polymer was measured by a stand-alone thermogravimetric analyzer TGA-50 mfd. by Shimadzu Corp., in a nitrogen atmosphere at a heating rate of 10° C./min. It was found from the above measurement that this polymer was thermally stable to a temperature close to 350° C.

Then an aromatic oligomer having a carboxyl group at one terminal of the molecule was synthesized in the following way. 0.4 mol (48.8 g) of benzoic acid, 0.8 mol (110.4 g) of parahydroxybenzoic acid and 0.88 mol (90 g) of acetic anhydride was supplied into a 500 ml separable flask equipped with an anchor-shaped agitator, a three-way stop cock and a Dimroth condenser. A Teflon sheet cut to a proper size was used as packing between the upper and lower portions of the flask. The anchor-shaped agitator was operated at 120 r.p.m. and nitrogen was introduced into the reaction system through the three-way stop cock to place the system under a nitrogen atmosphere while cooling water was passed into the Dimroth condenser. In this state, the separable flask was placed in an oil bath and the oil bath was heated to 160° C. With the oil bath kept at 160° C., an acetylation reaction was carried out for 2 hours under refluxing of acetic anhydride. Upon completion of the acetylation reaction, the Dimroth condenser was quickly replaced with a Liebig condenser and the oil bath was heated to 260° C. The time required for raising the temperature from 160° C. to 260° C. was about 40 minutes. Thereafter, the oil bath temperature was kept at 260° C. and acetic acid and acetic anhydride released away from the system were recovered by the Liebig condenser. Recovery of acetic acid, etc., was started after replacement of the Dimroth condenser with a Liebig condenser, and polycondensation was ended at the point when 104 g of acetic acid, etc., was recovered in about one hour.

After completion of polycondensation, the oligomer was taken out and pulverized by a pulverizer. There was obtained 130 g of powder. This powder was washed with 10 times as much amount (1,300 g) of methanol as follows to remove the low-molecular weight matter soluble in methanol. 130 g of said powder and 1,300 g of methanol were fed into a 2-litre separable flask, and after setting an anchor-shaped agitator and a Dimroth condenser to the flask, this separable flask was placed in an oil bath of 80° C. so that methanol could reflux in the system, and washing was conducted for one hour under reflux of methanol. Upon the end of washing, the product was filtered and the oligomer was recovered. Further, the recovered oligomer was dried by a vacuum dryer at 80° C. for 10 hours to obtain an aromatic oligomer having a carboxyl group alone at one terminal of the molecule. There was obtained 85.8 g of oligomer in a yield of 66%.

The flow temperature of this purified oligomer was measured, finding it was 182° C. Then weight loss on heating of this purified oligomer was measured by the above-mentioned apparatus TGA-50 in a nitrogen atmosphere at a heating rate of 10° C./min. It was consequently found that this purified oligomer was stable to a temperature close to 300° C.

Next, the result of determination of the molecular weight distribution of this purified oligomer is shown below.

In order to closely determine the number-average molecular weight of said aromatic oligomer, its number-average molecular weight was decided by the chemical decomposition method described below. The "chemical decomposition method" referred to herein is a method in which ester linkage of said aromatic oligomer is chemically severed and decomposed into monomer units in N-methyl-pyrrolidone (solvent) by using n-butylamine as decomposing agent, then the decomposed components are identified and quantified by liquid chromatography and the number-average degree of polymerization is determined from the number of the terminal groups.

More specifically, 50 mg of said oligomer was supplied into an egg plant type flask containing 40 ml of N-methylpyrrolidone and 10 ml of n-butylamine, and after connecting a condenser to the flask, decomposition was carried out in an oil bath of 80° C. under stirring by a magnetic stirrer for 12 hours, and thereby said oligomer was decomposed into N-n-butylbenzamide, N-n-butyl-p-hydroxybenzamide and p-hydroxybenzoic acid, and after evaporating away excess n-butylamine, the residue was filtered by a membrane filter with a pore side of 0.45 microns to prepare a test sample.

Measurement was made by using a high-performance liquid chromatographic system mfd. by Tosoh Co., Ltd. (pump: TOSOH CCPM; pump controller: TOSOH PX-8010 (used at measuring wavelength of 254 nm); recorder: CHROMATO-RECORDER 12 mfd. by System Instruments Co., Ltd.; column: TOSOH TSK-Gel ODS-120T), and each component was eluted and quantified according to the water-methanol gradient elution method.

The water used as solvent was a 1,000:5 (by volume) mixture of ion exchange water and acetic acid, and the methanol used in the above elusion was a 1,000:5 (by volume) mixture of methanol of electronic industrial grade produced by Sumitomo Chemical Industries Co., Ltd. and acetic acid. As for the gradient conditions, measurement was made at an aqueous concentration of 75 vol % for 0 minute, 60 vol % for 30 minutes, 0 vol % for 50 minutes and 75 vol % for 60 minutes (concentration was varied rectilinearly in each case).

Quantification of the respective components contained in said sample, conducted under the above-said conditions, gave the result of parahydroxybenzoic acid/N-n-butyl-p-hydroxybenzamide/N-n-butylbenzamide = 1.0/3.2/1.0 (molar ratio), and the number-average degree of polymerization of said oligomer was n = 4.2 in the following formula (9):

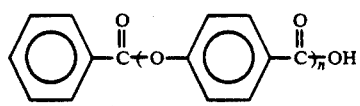
(9)

The above-described ethylene-methyl acrylate-glycidyl methacrylate terpolymer, the aromatic oligomer having a carboxyl group at one terminal of the molecule and represented by the above-shown formula, which oligomer has a number-average degre of polymerization n determined by the chemical decomposition method being n = 4.2, and a low-density polyethylene (LDPE) L-708 (MI at 190° C. under a load of 2.16 kg = 8 g/10 min; Tg = −115° C.) produced by Sumitomo Chemical Industries Co., Ltd. was melt mixed in the ratios shown in Table 1 and reacted with triparatolylphosphine as catalyst by using Laboplastomill ME-15 mfd. by Toyo Seiki Seisaku-sho, Ltd. and furnished with a R-60 mixer and roller type blades, at 280° C. and 120 r.p.m. for 10 minutes.

MI's of the kneaded products at 260° C. under a load of 10 kg are shown in Table 2. Also, each of the kneaded products was worked into a 2.1 mm thick pressed sheet at 280° C. under a pressure of 50 kg/cm², and the test pieces for determining the various properties were cut out from said pressed sheet, and the properties were determined. The results are shown in Table 2.

The graft efficiency of the obtained graft copolymer was analyzed and calculated by a method described below. 500 mg of the obtained graft copolymer had its aromatic oligomer portion decomposed by the above-described chemical decomposition method in 40 ml of N-methylpyrrolidone and 10 ml of n-butylamine. The ethylene-methyl acrylate-glycidyl methacrylate copolymer was precipitated in 500 ml of methanol to remove it, and after filtration, the filtrate was concentrated by an evaporator and, after removing methanol and excess n-butylamine, further filtered by a membrane filter with a pore size of 0.45 microns to prepare a test sample.

This sample was analyzed by high performance liquid chromatography using the same techniques as described above, and the respective decomposed components were quantified. Calculations can be made from the ratio of N-n-butylbenzamide to p-hydroxybenzamide decomposed from the aromatic oligomer portion.

More specifically, when the ratio of p-hydroxybenzoic acid to N-n-butylbenzamide quantified as decomposed components is expressed as $$x \left( = \frac{\text{p-hydroxybenzoic acid}}{\text{N-n-butylbenzamide}} \right),$$

the amount of the aromatic oligomer reacted as y (g) and the amount of the ethylenemethyl acrylate-glycidyl methacrylate copolymer used as Z (g), the graft efficiency can be calculated as follows.

When the ratio of the aromatic oligomer reacted to the ethylene-methyl acrylate-glycidyl methacrylate copolymer is expressed as $G_1$, $G_1$ is given as follows: $G_1 = (1-x) \times 100$ (%), and when the rate of reaction of the epoxy group of the ethylene-methyl acrylate-glycidyl methacrylate copolymer is expressed as $G_2$, $G_2$ is given as follows:

$$G_2 = \frac{(1-x) \times y \times 142}{Z \times 0.02 \times (120 n + 122)} \times 100 \, (\%)$$

When $G_2$ was determined for Examples 1 and 2 and Comparative Example 1 in the manner described above, it was 75%, 70% and 78%, respectively.

Examples 4–9 and Comparative Example 2

Kneading and reaction were carried out under the same kneading conditions as Examples 1–3, with triphenylphosphine as catalyst, by using, in place of LDPE used in Examples 1–3, polypropylene (PPr), NORBRENE® Y101 (MI (at 230° C. under 2.16 kg) = 12 g/10 min; Tg = −13° C.; produced by Sumitomo chemical Co., Ltd.), ethylene-propylene copolymer, ESPRENE® E-150P (MI (at 230° C. under 2.16 kg) = 4.0 g/10 min; Tg = −59° C.; ethylene content: 77 wt %; propylene content: 23 wt %; produced by the same company), ethylene-propylene copolymer, ESPRENE® E-201 (MI (at 230° C. under 2.16 kg) = 1.5 g/10 min; Tg = −63° C.; ethylene content: 46 wt %; propylene content: 54 wt %; produced by the same company), and ethylene-methyl acrylate copolymer, ESPRENE® EMA 2602 (MI (at 190° C. under 2.16 kg) = 3.3 g/10 min; Tg = −41° C.; ethylene content: 46 wt %; methyl acrylate content: 54 wt %; produced by the same company), in the compositions shown in Table 1.

The properties of the kneaded products were evaluated according to Examples 1–3. The results are shown in Table 2.

Examples 10 and 11 and Comparative Examples 3 and 4

An ethylene-methyl acrylate-glycidyl methacrylate terpolymer (ethylene/methyl acrylate/glycidyl methacrylate = 38.7/59/2.3 (ratio by weight); MI at 190° C. under a load of 2.16 kg = 8.7 g/10 min) was obtained according to the method described in Japanese Patent Application Kokai No. 61-127709, Example 5.

The glass transition temperature of this polymer as determined by the method described in Example 1 was −31.5° C. Also, the weight loss on heating curve of this polymer was determined by the same method as used in Example 1, from which it was found that this polymer was thermally stable to a temperature close to 350° C.

Then an aromatic oligomer having a carboxyl group at one terminal of the molecule was synthesized according to the method of Example 1 by using benzoic acid, parahydroxybenzoic acid and acetic anhydride (in a molar ratio of 1:1.8:2.0) as starting materials, then pulverized and washed with methanol in the same way as in Example 1 to obtain a purified oligomer. The flow temperature of this purified oligomer was 168° C., and its number-average degree of polymerization as determined by the above-described chemical decomposition method was 3.68. Then weight loss on heating of this purified oligomer was measured in the same way as Example 1, from which it was found that this polymer was stable to a temperature close to 300° C.

The above-described ethylene-methyl acrylate-glycidyl methacrylate terpolymer, the aromatic oligomer having a number-average degree of polymerization n as determined by the chemical decomposition method of 3.68 and possessing a carboxyl group at one terminal of the molecule, and a low-density polyethylene (LDPE) L-708 used in Example 1 or a polypropylene (PPr) NORBRENE® AZ-564 (MI (at 230° C. under 2.16 kg)=30 g/10 min) produced by Sumitomo Chemical Industries Co., Ltd. were melt kneaded and reacted, using triparatolylphosphine as catalyst, in the composition shown in Table 3, by using Laboplastomill 20R-20 (mfd. by Toyo Seiki Seisaku-sho) equipped with a R-60 mixer and roller type blades, at 280° C. and 200 r.p.m. for 5 minutes (3 minutes in Comparative Example 4). The properties of the kneaded products were evaluated according to Examples 1-3. The results are shown in Table 4.

Examples 12 and 13 and Comparative Example 5

An aromatic oligomer having a carboxyl group at one terminal of the molecule was synthesized according to the method described in Example 1 by using benzoic acid, parahydroxybenzoic acid and acetic anhydride (in a molar ratio of 1:3.5:3.85) as starting materials, and then pulverized and washed with methanol in the same way as in Example 1 to obtain a purified oligomer. The flow temperature of this purified oligomer was 243° C. and its number-average degree of polymerization as determined by the above-mentioned chemical decomposition method was 5.90. Then weight loss on heating of this purified oligomer was measured in the same way as Example 1, from which it was found this polymer was stable to a temperature close to 300° C.

This purified oligomer, the ethylene-methyl acrylate-glycidyl methacrylate terpolymer described in Examples 10 and 11, LDPE L-708 and PPr AZ-564 were melt kneaded, using triparatolylphosphine as catalyst, in the compositions shown in Table 3 under the same conditions as Example 9. The physical properties of the obtained kneaded products were evaluated according to Example 1-3. The results are shown in Table 4.

Comparative Example 6

The ethylene-methyl acrylate-glycidyl methacrylate terpolymer used in Example 10 and a low-density polyethylene (LDPE) L-708 used in Example 1 were melt kneaded in the compositions shown in Table 3 by the same method as used in Example 10. The properties of the obtained kneaded products were evaluated according to Examples 1-3. The results are shown in Table 4.

As for MI, it was greater than 100 under the conditions of 260° C. and 10 kg loading. When it was measured at 190° C. under a load of 2.16 kg, it was 11.8.

Referential Comparative Example 1

An aromatic oligomer having a carboxyl group at one terminal of the molecule was synthesized according to the method of Example 1 by using benzoic acid, parahydroxybenzoic acid and acetic anhydride (in a molar ratio of 1:1:1.1) as starting materials. The flow temperature of the synthesized aromatic oligomer was 89.7, and its number-average degree of polymerization as determined by the chemical decomposition method was 1.52.

When weight loss on heating of this aromatic oligomer was measured in the same way as Example 1, it showed loss of about 2.3 wt %/10° C. almost linearly in the temperature range of 120°-360° C., indicating that this polymer was thermally unstable.

Thus, when using this aromatic oligomer, it can not be expected that the produced graft copolymer would show a satisfactory thermal resistance, and there can only be obtained a graft copolymer which is thermally unstable.

TABLE 1

| | Kneading composition | | | | | |
|---|---|---|---|---|---|---|
| | Ethylene-methyl acrylate-glycidyl methacrylate terpolymer (g) | Aromatic oligomer (g) | Polyolefin | | Catalyst | |
| | | | Kind | Amount (g) | Kind | Amount (mg) |
| Example 1 | 40.5 | 4.5 | LDPE L-708 | 5.0 | Triparatolylphosphine | 45 |
| Example 2 | 36.9 | 4.1 | " | 8.2 | " | 41 |
| Example 3 | 34.2 | 3.8 | " | 11.4 | " | 38 |
| Comp. Example 1 | 45.0 | 5.0 | — | — | " | 50 |
| Example 4 | 40.5 | 4.5 | PPr Y-101 | 5.0 | Triphenylphosphine | 45 |
| Example 5 | 36.9 | 4.1 | " | 8.2 | " | 41 |
| Example 6 | 31.5 | 3.5 | E-150P | 15.0 | " | 100 |
| Example 7 | 31.5 | 3.5 | E-201 | 15.0 | " | 100 |
| Example 8 | 40.5 | 4.5 | EMA2602 | 5.0 | " | 100 |
| Example 9 | 31.5 | 3.5 | " | 15.0 | " | 100 |
| Comp. Example 2 | 45.0 | 5.0 | — | — | " | 50 |

TABLE 2

| | MI (260° C., 10 kg) (g/10 min) | Shore A hardness | Compression set (%) 25° C., 22 hr | Compression set (%) 100° C., 70 hr | Compression set (%) 160° C., 22 hr | Elongation at break (%) | Breaking strength (kg/cm²) | 100% modulus (kg/cm²) | Permanent set (%) |
|---|---|---|---|---|---|---|---|---|---|
| Example 1 | 35.0 | 24 | 37.3 | — | 57.2 | 800 | 33.0 | 7.4 | 30 |
| Example 2 | 60.2 | 26 | 37.9 | — | 62.1 | 850 | 46.4 | 13.9 | 80 |
| Example 3 | 84.5 | 34 | 47.1 | — | 56.5 | 800 | 51.0 | 23.4 | 130 |
| Comp. Example 1 | 32.4 | 19 | 38.0 | — | 56.0 | 1200 | 54.7 | 5.3 | 50 |
| Example 4 | 45.8 | 26 | — | 75.6 | — | 900 | 32.0 | 10.4 | 50 |
| Example 5 | 92.1 | 40 | — | 87.1 | — | 800 | 29.0 | 22.3 | 68 |
| Example 6 | 3.2 | 26 | — | 62.1 | — | Not measured | Not measured | Not measured | Not measured |
| Example 7 | 5.1 | 19 | — | 45.5 | — | 450 | 20.6 | 4.5 | 10 |
| Example 8 | 5.3 | 18 | — | 44.7 | — | 850 | 30.5 | 5.4 | 30 |
| Example 9 | 77.4 | 16 | — | 75.2 | — | 1250 | 16.4 | 3.2 | 60 |
| Comp. Example 2 | 2.8 | 22 | — | 69.5 | — | 825 | 33.0 | 6.0 | 35 |

TABLE 3

| | Ethylene-methyl acrylate-glycidyl methacrylate terpolymer (g) | Aromatic oligomer (g) | Polyolefin Kind | Polyolefin Amount (g) | Catalyst (triparatolyl-phosphine) (mg) |
|---|---|---|---|---|---|
| Example 10 | 36 | 4 | LDPE L-708 | 10 | 100 |
| Example 11 | 36 | 4 | PPr AZ-564 | 10 | 100 |
| Comp. Example 3 | 45 | 5 | — | — | 100 |
| Comp. Example 4 | 40 | 10 | — | — | 100 |
| Example 12 | 32 | 8 | LDPE L-708 | 10 | 100 |
| Example 13 | 34 | 6 | PPr AZ-564 | 10 | 100 |
| Comp. Example 5 | 40 | 10 | — | — | 100 |
| Comp. Example 6 | 40 | — | LDPE L-708 | 10 | — |

TABLE 4

| | MI (260° C., 10 kg) (g/10 min) | Shore A hardness | Compression set (100° C., 70 hr) (%) | Elongation at break (%) | Breaking strength (kg/cm²) | 100% modulus (kg/cm²) | Permanent set (%) |
|---|---|---|---|---|---|---|---|
| Example 10 | 55.8 | 29 | 74.6 | 850 | 30.5 | 13.4 | 150 |
| Example 11 | 140 | 25 | 82.0 | 975 | 22.4 | 11.8 | 90 |
| Comp. Example 3 | 71.0 | 12 | 73.3 | 1200 | 25.8 | 3.8 | 50 |
| Comp. Example 4 | 0.24 | 20 | 43.1 | 375 | 27.8 | 6.3 | 10 |
| Example 12 | 81.1 | 30 | 82.5 | 600 | 34.3 | 19.8 | 140 |
| Example 13 | 158 | 38 | 76.7 | 416 | 26.7 | 22.1 | 35 |
| Comp. Example 5 | 96.2 | 18 | 87.5 | 1050 | 23.4 | 5.9 | 45 |
| Comp. Example 6 | >100 | 10 | 100 | 1025 | 1.3 | 2.4 | 250 |

INDUSTRIAL APPLICABILITY

The thermoplastic elastomer composition of this invention, as described above, shows the behavior of an excellent rubber elastomer even at high temperatures and is also excellent in thermal resistance, so that it can be used as material for various types of hoses such as oil cooler hose, air duct hose, power stearing hose, control hose, oil return hose, heat-resisting hose, etc., material for various types of seals such as various oil seals, O-rings, packings, gaskets, etc., and material for various kinds of diaphgrams, rubber plates, belts, oil level gages, hose masking, sound insulators, etc. Thus, the scope of application of this invention is very wide.

We claim:

1. A thermoplastic elastomer composition comprising a thermoplastic graft copolymer of which main chain is constituted by a polymer having a glass transition temperature of 10° C. or below and side chain is constituted by an aromatic oligomer having a flow temperature between 100° C. and 400° C., and an olefinic polymer wherein the flow temperature is the temperature at which the oligomer shows a melt viscosity of 48,000 poises when the oligomer is melted by heating at a rate of 4° C./min and extruded from a nozzle of 1 mm in inner diameter and 10 mm in length under a load of 100 kg/cm² and wherein a ratio of the polymer having the glass transition temperature of 10° C. or below to the aromatic oligomer is 99:1 to 50:50 by weight.

2. A thermoplastic elastomer composition according to claim 1, wherein the side chain of the thermoplastic graft copolymer is constituted by an aromatic oligomer having a flow temperature of 150°-350° C.

3. A thermoplastic elastomer composition according to claim 1, wherein the aromatic oligomer contains 50% by weight or more of a structural units represented by the general formula (1):

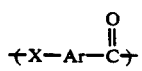

wherein X is selected from O and S, and the structural unit containing O and the structural unit containing S may both be contained in one oligomer; and Ar is selected from the general formulae (2), (3) and (4):

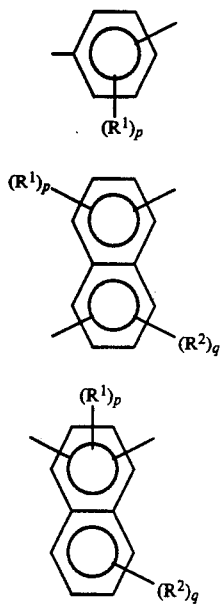

wherein $R^1$ and $R^2$ are each selected from an alkyl group having 1-3 carbon atoms and a phenyl group; $R^1$ and $R^2$ may be a same or different groups, and the different groups may be attached to one benzene ring; and p and q are each an integer of 0-2.

4. A thermoplastic elastomer composition according to claim 1, wherein the number-average degree of polymerization of the aromatic oligomer is 2 to 10.

5. A thermoplastic elastomer composition according to claim 1, wherein the number-average molecular weight of the aromatic oligomer is 300 to 1,500.

6. A thermoplastic elastomer composition according to claim 1, wherein the glass transition temperature of the main chain of the thermoplastic graft copolymer is 0° C. or below.

7. A thermoplastic elastomer composition according to claim 1, wherein the main chain of the thermoplastic graft copolymer is a polymer selected from the group consisting of acrylic ester polymer, styrene-butadiene copolymer and its hydrogenated product, styrene-isoprene copolymer and its hydrogenated product, polybutadiene, polyisoprene, ethylene-propylene copolymer, ethylene-propylene-diene copolymer, acrylonitrile-butadiene copolymer and its hydrogenated product, polychloroprene, ethylene-acrylic ester copolymer, chlorosulfonated polyethylenes, polyorganosiloxanes and polyphosphazene.

8. A thermoplastic elastomer composition according to claim 1, wherein the olefinic polymer is a polymer selected from the group consisting of polyethylene, polypropylene, ethylene-propylene copolymer, ethylene-butene copolymer, ethylene-propylene-diene terpolymer, ethylene-methyl acrylate copolymer and ethylene-ethyl acrylate copolymer.

9. A thermoplastic elastomer composition according to claim 1, wherein the weight ratio of the graft copolymer to the olefinic polymer is 99:1 to 50:50.

10. A process for preparing a thermoplastic elastomer composition set forth in claim 1, which comprises reacting a polymer having a glass transition temperature of 10° C. or below and possessing a functional group reactable with carboxyl group, and an aromatic oligomer having a flow temperature of 100° C. or above and possessing a carboxyl group at one terminal of the molecule, thereby obtaining a graft copolymer, and mixing said graft copolymer with an olefinic polymer.

11. A thermoplastic elastomer composition comprising a thermoplastic graft copolymer of which main chain is constituted by a polymer having a glass transition temperature of 10° C. or below and side chain is constituted by an aromatic oligomer having a flow temperature between 100° C. and 400° C., and an olefinic polymer wherein the flow temperature is the temperature at which the oligomer shows a melt viscosity of 48,000 poises when the oligomer is melted by heating at a rate of 4° C./min and extruded from a nozzle of 1 mm in inner diameter and 10 mm in length under a load of 100 kg/cm² and wherein a ratio of the polymer having the glass transition temperature of 10° C. or below to the aromatic oligomer is 99:1 to 50:50 by weight, and said elastomer composition having a Shore A hardness of 40 or less.

* * * * *